Sept. 5, 1961 M. MASONSON 2,999,155

SIGNAL RECEIVING SYSTEM

Filed May 7, 1959 2 Sheets-Sheet 1

INVENTOR.
MARTIN MASONSON
BY Alfred C. Hill
AGENT

INVENTOR.
MARTIN MASONSON
BY Alfred C. Hill
AGENT

United States Patent Office 2,999,155
Patented Sept. 5, 1961

2,999,155

SIGNAL RECEIVING SYSTEM

Martin Masonson, Nutley, N.J., assignor to International Telephone and Telegraph Corporation, Nutley, N.J., a corporation of Maryland Filed May 7, 1959, Ser. No. 811,735
18 Claims. (Cl. 250—20)

This invention relates to a signal demodulation circuit for signal receiving systems and more particularly to a demodulation circuit for a double sideband suppressed carrier communication receiving system.

Suppressed carrier communication systems are of value because of the power saving that is made possible thereby. The use of double sideband suppressed carrier is sometimes preferred over single sideband suppressed carrier operation because, (1) it is less costly to convert existing amplitude modulation equipment to double sideband suppressed carrier operation, (2) the double sideband system does not require any more power than the single sideband system, and (3) the double sideband system is less susceptible to jamming.

Heretofore, all detection circuits for double sideband suppressed carrier receiving systems had to necessarily provide a means to inject a frequency equal to the carrier frequency into the modulation envelope portions in order to extract the one of said envelope portions from the suppressed carrier. Consequently, an undesirable problem of double sideband suppressed carrier detection circuits is the necessity of including an oscillator to provide a locally generated carrier signal to be injected into the modulation envelope portions in the correct phase and frequency. Any frequency instability in either the suppressed carrier transmitter or receiver would naturally complicate this problem.

Therefore an object of the present invention is to provide a signal receiver for double sideband suppressed carrier communication overcoming the objections of the prior art receivers of this type.

Another object of the present invention is to provide an improved demodulation circuit for suppressed carrier communication receivers.

Still another object of the present invention is to provide an improved demodulation circuit for double sideband suppressed carrier receivers which eliminate the need for carrier signal injection equipment.

A further object of the present invention is to provide an improved demodulation circuit for double sideband suppressed carrier receivers which is not effected by carrier frequency instability.

A feature of the present invention is a double sideband suppressed carrier demodulation system comprising means to detect the undulations of the modulation envelope portions having the same polarity in a signal containing positive and negative modulation envelope portions symmetrically disposed with respect to a suppressed carrier frequency, an inverter means to periodically invert the polarity of said detected undulations to produce a signal equivalent to one of said envelope portions and a utilization means to utilize the output of said inverter means.

Another feature of the present invention is the provision of an inverter means as described above including a first path coupled to the output of the detector means having the output signal of the detector means thereon, a second path coupled to the output of the detector means having an inverted version of the output signal of the detector means thereon and a means responsive to the output signal of the detector means to alternately pass an output signal from the first and second paths to thereby produce a composite output signal equivalent to one of the sideband signals.

Still another feature of the present invention is a system as described which also includes in said responsive means an integrator to distinguish between the undulations of the modulation envelope portions which cross the symmetrical axis, and the undulations of the modulation envelope portions which are tangent to the symmetrical axis.

The above-mentioned and other objects and features of this invention will become more apparent by reference to the following description taken in conjunction with the accompanying drawings in which.

Figure 1:
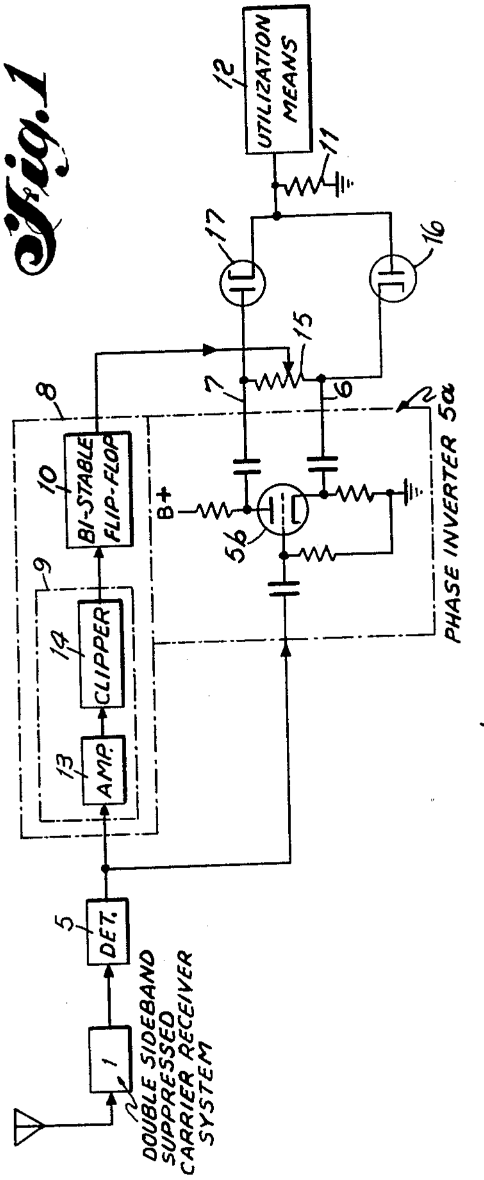
FIG. 1 is a schematic diagram of one embodiment of a signal receiving system in accordance with the principles of the present invention.
Figure 3:
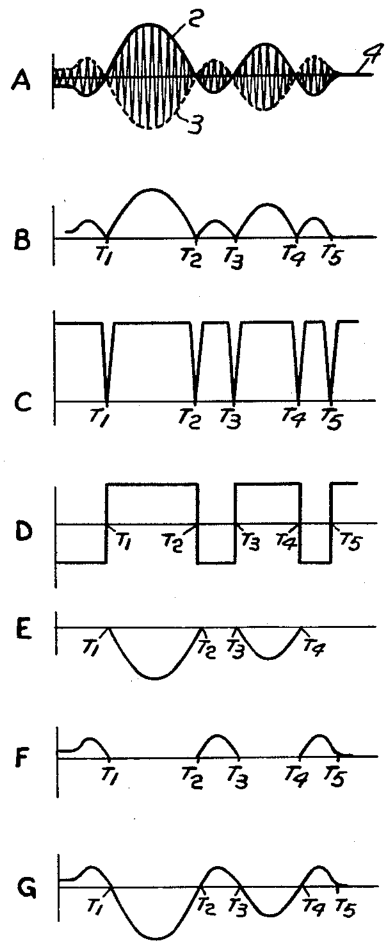
FIG. 3 is a series of waveforms useful in explaining the operation of the embodiments of FIG. 1 and FIG. 2.

Referring to FIG. 1, double sideband suppressed carrier receiver system 1 provides a double sideband suppressed carrier signal represented by curve "A," FIG. 3 with the positive envelope portion 2 and the negative envelope portion 3 being symmetrically disposed to a suppressed carrier frequency represented by line 4. The signal from receiver system 1 is fed to a conventional amplitude modulation detector 5, which detects the positive undulations of both the positive and negative envelope portions of the signal, resulting in an output signal represented by curve "B," FIG. 3. Since the positive and negative envelope portions of the suppressed carrier signal are identical in phase and magnitude but differ in polarity, curve B could also represent the full-wave rectified form of either envelope portion. Realizing this, it follows that if the full-wave rectified undulations shown by curve B were to be alternately reversed in polarity, the result would be a curve representative of one detected envelope portion of the double sideband suppressed carrier signal. In order to accomplish this polarity reversal a pair of paths 6 and 7 are coupled to detector 5, through means of phase inverter *5a*. Path 6 coupled to the cathode of electron discharge device *5b* contains an in phase version of the output signal of detector 5 and path 7 coupled to the anode of device *5b* contains a phase inverted version of the output signal of detector 5. A means 8 responsive to the output signal of detector 5, including a zero crossing marker 9 and a bistable flip-flop 10, is employed to alternately couple paths 6 and 7 to an output means illustrated as resistor 11 to produce a signal equivalent to one of the envelope portions. A utilization means 12 is employed to utilize the envelope portion signal.

The means 8 responsive to detector 5 functions to generate a gating signal which will be in synchronism with the undulations of the output signal of detector 5 as represented by curve B, FIG. 3. The desired gating signal is generated by feeding the output signal of detector 5 to a zero crossing marker 9 consisting of amplifier 13 and clipping circuit 14 wherein it is amplified and clipped above a predetermined level. The output signal of zero-crossing marker 9 is a trigger signal which appears as shown by curve C, FIG. 3. The output signal from zero-crossing marker 9 is applied to bistable flip-flop circuit 10 where it triggers an output therefrom. The output signal of flip-flop circuit 10 appears as a series of square wave pulses, as shown by curve D, FIG. 3, which are necessarily synchronized in time relationship with the zero crossings of the positive and negative envelope portions of the input signal from receiver system 1. The output signal from detector 5 is applied through phase inverter 5a to paths 6 and 7 and the gating pulses from flip flop 10 are applied to paths 6 and 7 through resistor 15. Paths 6 and 7 include therein diodes 16 and 17 poled as indicated. The gating pulses alternately bias diodes 16 and 17 permitting either diode 16 or 17 to conduct depending on the instantaneous polarity of the gating pulse. Since the gating pulses are in synchronism with the undulations of the output signal of detector 5, the signals on paths 6 and 7 will be alternately passed by diodes 16 and 17 so that the undulations of curve B, FIG. 3, will appear with alternating polarity at resistor 11 as indicated in curve G, FIG. 3.

The output signal from diode 17 appears as represented by curve E, FIG. 3, and the output signal from diode 16 appears as represented by curve F, FIG. 3. These two output signals are summed in resistor 11 and results in a signal represented by curve G, FIG. 3. This output signal is identical with the negative envelope portion 3 of the input signal as represented by curve A, FIG. 3. If the output signal at resistor 11 were inverted it would be identical with the positive envelope portion 2 of the double sideband suppressed carrier input signal.

The advantage of this improved detection method for double sideband suppressed carrier signals is that it is not necessary to know the carrier frequency at which the signals are being transmitted, and a local oscillator to generate a signal at the carrier frequency for injection purpose does not need to be provided. The detected positive or negative envelope portion of the input signal may be obtained by judicious synthesis of the positive undulations of the positive and negative envelope portions which are readily obtainable through conventional detection of the double sideband suppressed carrier signal.

In some instances the envelope portions of a double sideband suppressed carrier signal may be tangent to, but not cross, the symmetrical zero axis. In this event, the circuit of FIG. 1 will not operate in a correct fashion due to the fact that the envelope portion's tangential intersection of the symmetrical zero axis would result in the triggering of bistable flip flop 10 which would cause a polarity reversal in resistor 11 when actually no polarity reversal was warranted inasmuch as the envelope portion did not cross the zero axis and change polarity. In an audio system this error would have no appreciable effect and would not be discernible to the listener. Nevertheless, if it is desired that this error be prevented, the embodiment shown in FIG. 2 should be employed.

Figure 2:
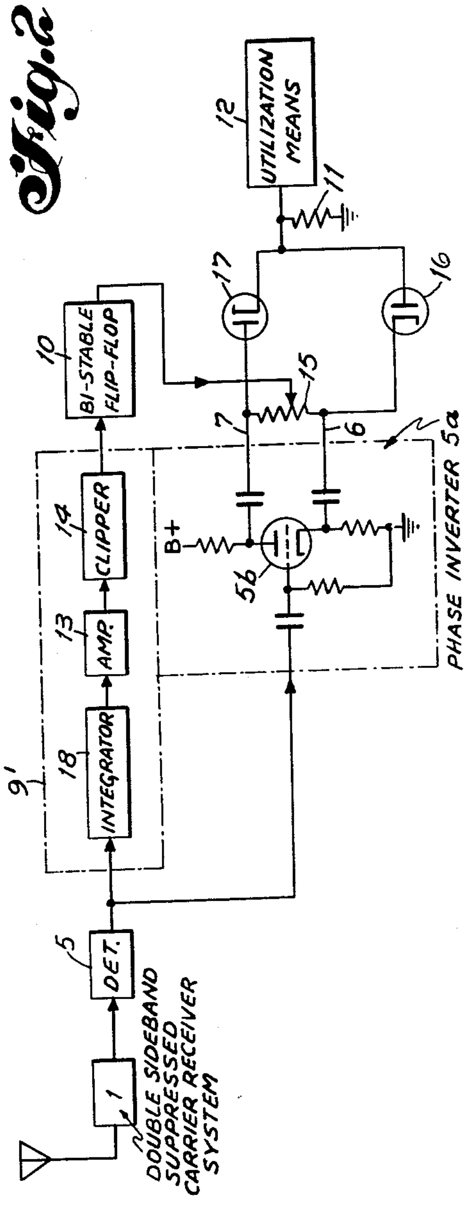
FIG. 2 is a schematic diagram of another embodiment of a signal receiving system in accordance with the principles of the present invention.

The circuit shown in FIG. 2 is identical in structure and operation to the circuit of FIG. 1 with the exception that an integrator 18 is added to the zero-crossing marker 9 and is coupled between detector 5 and amplifier 13. If one of the envelope portions of the input signal from source 1 intersect the symmetrical zero axis tangentially, but does not cross it, the envelope portion would have to have a zero slope at the point of tangency. Integrator 18 will not produce an output signal for an input signal of zero slope, and consequently a trigger signal would not be produced at the output of zero crossing marker 9' for that point of tangency, with the result that no erroneous phase reversal will occur in the output signal at resistor 11. When the positive undulations of the envelope portions do cross the zero axis, the slopes will not be zero and integrator 18 will produce an output signal to amplifier 13 and the circuit will function in the same manner as described with respect to the circuit shown in FIG. 1.

While I have described above the principles of my invention in connection with specific apparatus, it is to be clearly understood that this description is made only by way of example and not as a limitation to the scope of my invention as set forth in the objects thereof and in the accompanying claims.

I claim:

1. A demodulation system for double sideband suppressed carrier communication systems comprising a source of input signals containing positive and negative modulation envelope portions symmetrically disposed with reference to a suppressed carrier frequency, means coupled to said source to detect the undulations of both of said envelope portions having the same polarity, a pair of paths coupled to said detector means, one of said paths having the output signal of said detector means thereon and the other of said paths including means to provide a signal having a polarity opposite to the signal of said one of said paths, an output means, means responsive to the output signal of said detector means to alternately couple said pair of paths to said output means to produce a signal in said output means equivalent to one of said envelope portions and utilization means coupled to said output means to utilize said equivalent envelope portion signal.

2. A demodulation system for double sideband suppressed carrier communication systems comprising a source of input signals containing positive and negative modulation envelope portions symmetrically disposed with reference to a suppressed carrier frequency, means coupled to said source to detect the undulations of both of said envelope portions having the same polarity, a pair of paths coupled to said detector means, one of said paths having the output signal of said detector means thereon and the other of said paths including means to provide a signal having a polarity opposite to the signal of said one of said paths, an output means, switching means responsive to the output signal of said detector means and coupled to said pair of paths to alternately couple said pair of paths to said output means to produce a signal in said output means equivalent to one of said envelope portions, and utilization means coupled to said output means to utilize said equivalent envelope portion signal.

3. A demodulation system for double sideband suppressed carrier communication systems comprising a source of input signals containing positive and negative modulated envelope portions symmetrically disposed with reference to a suppressed carrier frequency, means coupled to said source to detect the undulations of both of said envelope portions having the same polarity, a pair of paths coupled to said detector means, one of said paths having the output signal of said detector means thereon and the other of said paths including means to provide a signal having a polarity opposite to the signal of said one of said paths, means coupled to the output of said detector means to produce trigger signals in accordance with the occurrence of said undulations, means coupled to the output of said trigger means to produce a series of gating signals in accordance with the occurrence of said trigger signals, an output means, circuit means coupled to said gating signal producing means and said pair of paths to alternately couple said pair of paths to said output means in response to said gating signals to produce a signal in said output means equivalent to one of said envelope portions, and utilization means coupled to said output means to utilize said equivalent envelope portion signal.

4. A demodulation system for double sideband suppressed carrier communication systems comprising a source of input signals containing positive and negative modulated envelope portions symmetrically disposed with reference to a suppressed carrier frequency, means coupled to said source to detect the undulations of both of said envelope portions having the same polarity, a pair of paths coupled to said detector means, one of said paths having the output signal of said detector means thereon and the other of said paths including means to provide a signal having a polarity opposite to the signal of said one of said paths, an amplifier means coupled to the output of said detector means to amplify said detected undulations, a clipping circuit coupled to the output of said amplifier means to maintain said detected undulations at a constant amplitude, a multivibrator coupled to the output of said clipping circuit to produce an alternating square wave signal in accordance with said detected undulations, an output means, circuit means coupled to said multivibrator and to said pair of paths to alternately couple said pair of paths to said output means in response to said square wave signal to produce a signal in said output means equivalent to one of said envelope portions, and utilization means coupled to said output means to utilize said equivalent envelope portion signal.

5. A demodulation system for double sideband suppressed carrier communication systems comprising a source of input signals containing positive and negative modulated envelope portions symmetrically disposed with reference to a suppressed carrier frequency, means coupled to said source to detect the undulations of both of said envelope portions having the same polarity, a pair of paths coupled to said detector means, one of said paths having the output signal of said detector means thereon and the other of said paths including means to provide a signal having a polarity opposite to the signal of said one of said paths, an integrator means coupled to the output of said detector, means to integrate said detected undulations, an amplifier means coupled to the output of said integrator means to amplify said integrated detected undulations, a clipping circuit coupled to the output of said amplifier means to maintain said integrated detected undulations at a constant amplitude, a multivibrator coupled to the output of said clipping circuit to produce an alternating square wave signal in accordance with said integrated detected undulations, an output means, circuit means coupled to said multivibrator and to said pair of paths to alternately couple said pair of paths to said output means in response to said square wave signal to produce a signal in said output means equivalent to one of said envelope portions, and utilization means coupled to said output means to utilize said equivalent envelope portion signal.

6. A demodulation system for double sideband suppressed carrier communication systems comprising a source of input signals containing positive and negative modulated envelope portions symmetrically disposed with reference to a suppressed carrier frequency, means coupled to said source to detect the undulations of both of said envelope portions having the same polarity, a pair of paths coupled to said detector means, one of said paths having the output signal of said detector means thereon and the other of said paths including means to provide a signal having a polarity opposite to the signal of said one of said paths, two unidirectional devices, the first of said devices serially connected to one of said paths and the second of said devices serially connected to the other of said paths, said two devices being connected in said paths for current flow therethrough in the same direction, an integrator means coupled to the output of said detector means to integrate said detected undulations, an amplifier means coupled to the output of said integrator means to amplify said integrated detected undulations, a clipping circuit coupled to the output of said amplifier means to maintain said integrated detected undulations at a constant amplitude, a multivibrator coupled to the output of said clipping circuit to produce an alternating square wave signal in accordance with said integrated detected undulations, an output means, means coupling the output of said multivibrator to said two devices to alternately couple said pair of paths to said output means in response to said square wave signal to produce a signal in said output means equivalent to one of said envelope portions, and utilization means coupled to said output means to utilize said equivalent envelope portion signal.

7. A demodulation system for double sideband suppressed carrier communication system comprising a source of input signals containing positive and negative modulated envelope portions symmetrically disposed with reference to a suppressed carrier frequency, means coupled to said source to detect the undulations of both of said envelope portions having the same polarity, a pair of paths coupled to said detector means, one of said paths having the output signal of the detector means thereon and the other of said paths including a phase inverter to provide a signal having a polarity opposite to the signal of said one of said paths, an output means, means responsive to the output signal of said detector means to alternately couple said pair of paths to said output means to produce a signal in said output means equivalent to one of said envelope portions and utilization means coupled to said output means to utilize said equivalent envelope portion signal.

8. A demodulation system for double sideband suppressed carrier communication systems comprising a source of input signals containing positive and negative modulated envelope portions symmetrically disposed with reference to a suppressed carrier frequency, means coupled to said source to detect the undulations of both of said envelope portions having the same polarity, a pair of paths coupled to said detector means, one of said paths having the output signal of the detector means thereon and the other of said paths including a phase inverter to provide a signal having a polarity opposite to the signal of said one of said paths, an output means, switching means responsive to the output signal of said detector means and coupled to said pair of paths to alternately couple said pair of paths to said output means to produce a signal in said output means equivalent to one of said envelope portions, and utilization means coupled to said output means to utilize said equivalent envelope portion signal.

9. A demodulation system for double sideband suppressed carrier communication systems comprising a source of input signals containing positive and negative modulated envelope portions symmetrically disposed with reference to a suppressed carrier frequency, means coupled to said source to detect the undulations of both of said envelope portions having the same polarity, a pair of paths coupled to said detector means, one of said paths having the output signal of the detector means thereon and the other of said paths including a phase inverter to provide a signal having a polarity opposite to the signal of said one of said paths, an output means, means coupled to the output of said detector means to produce trigger signals in accordance with the occurrence of said undulations, means coupled to the output of said trigger means to produce a series of gating signals in accordance with the occurrence of said trigger signals, circuit means coupled to said gating signal producing means and said pair of paths to alternately couple said pair of paths to said output means in response to said gating signals to produce a signal in said output means equivalent to one of said envelope portions and utilization means coupled to said output means to utilize said equivalent envelope portion signal.

10. A demodulation system for double sideband suppressed carrier communication systems comprising a source of input signals containing positive and negative modulated envelope portions symmetrically disposed with reference to a suppressed carrier frequency, means coupled to said source to detect the undulations of both of said envelope portions having the same polarity, a pair of paths coupled to said detector means, one of said paths having the output signal of the detector means thereon and the other of said paths including a phase inverter to provide a signal having a polarity opposite to the signal of said one of said paths, an output means, an amplifier means coupled to the output of said detector means to amplify said detected undulations, a clipping circuit coupled to the output of said amplifier means to maintain said detected undulations at a constant amplitude, a multivibrator coupled to the output of said clipping circuit to produce an alternating square wave signal in accordance with said detected undulations, circuit means coupled to said multivibrator and to said pair of paths to alternately couple said pair of paths to said output means in response to said square wave signal to produce a signal in said output means equivalent to one of said envelope portions, and utilization means coupled to said output means to utilize said equivalent envelope portion signal.

11. A demodulation system for double sideband suppressed carrier communication systems comprising a source of input signal containing positive and negative modulation envelope portions symmetrically disposed with reference to a suppressed carrier frequency, means coupled to said source to detect the undulations of both of said envelope portions having the same polarity, a pair of paths coupled to said detector means, one of said paths having the output signal of the detector means thereon and the other of said paths including a phase inverter to provide a signal having a polarity opposite to the signal of said one of said paths, an integrator means coupled to the output of said detector means to integrate said detected undulations, an amplifier means coupled to the output of said integration means to amplify said integrated detected undulations, a clipping circuit coupled to the output of said amplifier means to maintain said integrated detected undulations at a constant amplitude, a multivibrator coupled to the output of said clipping circuit to produce an alternating square wave signal in accordance with said integrated detected undulations, an output means, circuit means coupled to said multivibrator and to said pair of paths to alternately couple said pair of paths to said output means in response to said square wave signal to produce a signal in said output means equivalent to one of said envelope portions, and utilization means coupled to said output means to utilize said equivalent envelope portion signal.

12. A demodulation system for double sideband suppressed carrier communication systems comprising a source of input signals containing positive and negative modulation envelope portions symmetrically disposed with reference to a suppressed carrier frequency, means coupled to said source to detect the undulations of both of said envelope portions having the same polarity, a pair of paths coupled to said detector means, one of said paths having the output signal of the detector means thereon and the other of said paths including a phase inverter to provide a signal having a polarity opposite to the signal of said one of said paths, two diodes, the first of said diodes serially connected to one of said paths and the second of said diodes serially connected to the other of said paths, said two diodes being connected in said paths for current flow therethrough in the same direction, an integrator means coupled to the output of said detector means to integrate said detected undulations, an amplifier means coupled to the output of said integrator means to amplify said integrated detected undulations, a clipping circuit coupled to the output of said amplifier means to maintain said integrated detected undulations at a constant amplitude, a multivibrator coupled to the output of said clipping circuit to produce an alternating square wave signal in accordance with said integrated undulations, an output means coupled in common to said pair of paths, a resistance means connected in common to said pair of paths having a center tap coupled to said multivibrator to couple said alternating square wave signal to said two diodes to alternately bias said diodes to produce a signal in said output means equivalent to one of said envelope portions, and utilization means coupled to said output means to utilize said equivalent envelope portion signal.

13. A receiver system for double sideband suppressed carrier communication systems comprising means to receive signals containing intelligence in the form of positive and negative modulation envelope portions symmetrically disposed with reference to a suppressed carrier frequency and a demodulator to recover said intelligence including means coupled to said signal receiving means to detect the undulations of both of said envelope portions having the same polarity, a pair of paths coupled to said detector means, one of said paths having the output signal of said detector means thereon and the other of said paths including means to provide a signal having a polarity opposite to the signal of said one of said paths, an output means, means responsive to the output signal of said detector means to alternately couple said pair of paths to said output means to produce a signal in said output means equivalent to one of said envelope portions, and utilization means coupled to said output means to utilize said equivalent envelope portion signal.

14. A receiver system for double sideband suppressed carrier communication systems comprising means to receive signals containing intelligence in the form of positive and negative modulation envelope portions symmetrically disposed with reference to a suppressed carrier frequency and a demodulator to recover said intelligence including means coupled to said signal receiving means to detect the undulations of both of said envelope portions having the same polarity, a pair of paths coupled to said detector means, one of said paths having the output signal of said detector means thereon and the other of said paths including means to provide a signal having a polarity opposite to the signal of said one of said paths, an output means, switching means responsive to the output signal of said detector means and coupled to said pair of paths to alternately couple said pair of paths to said output means to produce a signal in said output means equivalent to one of said envelope portions and utilization means coupled to said output means to utilize said equivalent envelope portion signal.

15. A receiver system for double sideband suppressed carrier communication systems comprising means to receive signals containing intelligence in the form of positive and negative modulation envelope portions symmetrically disposed with reference to a suppressed carrier freqency and a demodulator to recover said intelligence including means coupled to said signal receiving means to detect the undulations of both of said envelope portions having the same polarity, a pair of paths coupled to said detector means, one of said paths having the output signal of said detector means thereon and the other of said paths including means to provide a signal having a polarity opposite to the signal of said one of said paths, means coupled to the output of said detector means to produce trigger signals in accordance with the occurrence of said undulations, means coupled to the output of said trigger means to produce a series of gating signals in accordance with the occurrence of said trigger signals, an output means, circuit means coupled to said gating signal producing means and said pair of paths to alternately couple said pair of paths to said output means in response to said gating signals to produce a signal in said output means equivalent to one of said envelope portions, and utilization means coupled to said output means to utilize said equivalent envelope portion signal.

16. A receiver system for double sideband suppressed carrier communication systems comprising means to receive signals containing intelligence in the form of positive and negative modulation envelope portions symmetrically disposed with reference to a suppressed carrier frequency and a demodulator to recover said intelligence including means coupled to said signal receiving means to detect the undulations of both of said envelope portions having the same polarity, a pair of paths coupled to said detector means, one of said paths having the output signal of the detector means thereon and the other of said paths including a phase inverter to provide a signal having a polarity opposite to the signal of said one of said paths, an output means, means responsive to the output signal of said detector means to alternately couple said pair of paths to said output means to produce a signal in said output means equivalent to one of said envelope portions, and utilization means coupled to said output means to utilize said equivalent envelope portion signal.

17. A receiver system for double sideband suppressed carrier communication systems comprising means to receive signals containing intelligence in the form of positive and negative modulation envelope portions symmetrically disposed with reference to a suppressed carrier frequency and a demodulator to recover said intelligence including means coupled to said signal receiving means to detect the undulations of both of said envelope portions having the same polarity, a pair of paths coupled to said detector means, one of said paths having the output signal of the detector means thereon and the other of said paths including a phase inverter to provide a signal having a polarity opposite to the signal of said one of said paths, an output means, switching means responsive to the output signal of said detector means and coupled to said pair of paths to alternately couple said pair of paths to said output means to produce a signal in said output means equivalent to one of said envelope portions, and utilization means coupled to said output means to utilize said equivalent envelope portion signal.

18. A receiver system for double sideband suppressed carrier communication systems comprising means to receive signals containing intelligence in the form of positive and negative modulation envelope portions symmetrically disposed with reference to a suppressed carrier frequency and a demodulator to recover said intelligence including means coupled to said signal receiving means to detect the undulations of both of said envelope portions having the same polarity, a pair of paths coupled to said detector means, one of said paths having the output signal of the detector means thereon and the other of said paths including a phase inverter to provide a signal having a polarity opposite to the signal of said one of said paths, an output means, means coupled to the output of said detector means to produce trigger signals in accordance with the occurrence of said undulations, means coupled to the output of said trigger means to produce a series of gating signals in accordance with the occurrence of said trigger signals, circuit means coupled to said gating signal producing means and said pair of paths to alternately couple said pair of paths to said output means in response to said gating signals to produce a signal in said output means equivalent to one of said envelope portions and utilization means coupled to said output means to utilize said equivalent envelope portion signal.

References Cited in the file of this patent

UNITED STATES PATENTS 2,784,311 Kahn ---------------- Mar. 5, 1957